(12) United States Patent
Waring

(10) Patent No.: US 7,270,459 B2
(45) Date of Patent: *Sep. 18, 2007

(54) METHOD AND APPARATUS FOR DIRECTING LIGHT FROM A LIGHT SOURCE

(76) Inventor: Patrick S. Waring, 7125 Overhill Ave., Las Vegas, NV (US) 89129

( * ) Notice: Subject to any disclaimer, the term of this patent is extended or adjusted under 35 U.S.C. 154(b) by 0 days.

This patent is subject to a terminal disclaimer.

(21) Appl. No.: 11/580,334

(22) Filed: Oct. 12, 2006

(65) Prior Publication Data
US 2007/0030692 A1 Feb. 8, 2007

Related U.S. Application Data

(63) Continuation of application No. 10/993,009, filed on Nov. 18, 2004, now Pat. No. 7,125,147.

(51) Int. Cl.
*F21S 8/02* (2006.01)
(52) U.S. Cl. .................. 362/576; 362/580; 362/304; 385/146
(58) Field of Classification Search .............. 362/304, 362/294, 551, 142, 576, 580, 581; 385/146
See application file for complete search history.

(56) References Cited

U.S. PATENT DOCUMENTS

| 5,709,456 | A | * | 1/1998 | Smith et al. | 362/84 |
|---|---|---|---|---|---|
| 6,481,882 | B1 | * | 11/2002 | Pojar | 362/559 |
| 6,923,549 | B2 | * | 8/2005 | Hoy | 362/101 |
| 7,014,341 | B2 | * | 3/2006 | King et al. | 362/296 |
| 7,125,147 | B2 | | 10/2006 | Waring | |
| 2004/0165388 | A1 | * | 8/2004 | Shoji | 362/304 |

* cited by examiner

*Primary Examiner*—Laura Tso
(74) *Attorney, Agent, or Firm*—Weide & Miller, Ltd.

(57) ABSTRACT

A light guide is configured to direct light from a light source. The light guide has an outer guide member and an inner guide member located in the outer guide member. A light passage is defined through the light guide between the inner and outer guide members. When a first end of the light guide is positioned adjacent a light source, light is permitted to pass from the light source through only the light passage in the light guide. The configuration of the light guide reduces passage of light off-angle to the length of the light passage through the guide, such that light is directed substantially parallel to the light passage. The light guide is thus effective in eliminating light dispersion and associated light banding and in focusing light upon a particular object or area.

16 Claims, 3 Drawing Sheets

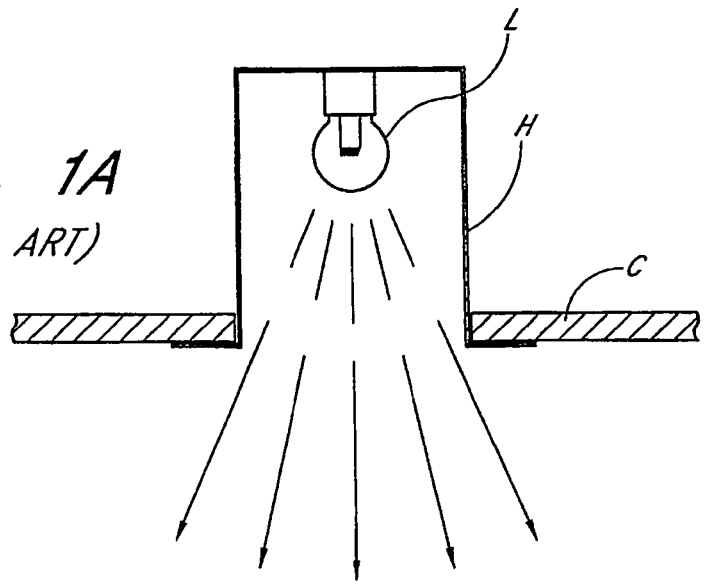
FIG. 1A (PRIOR ART)
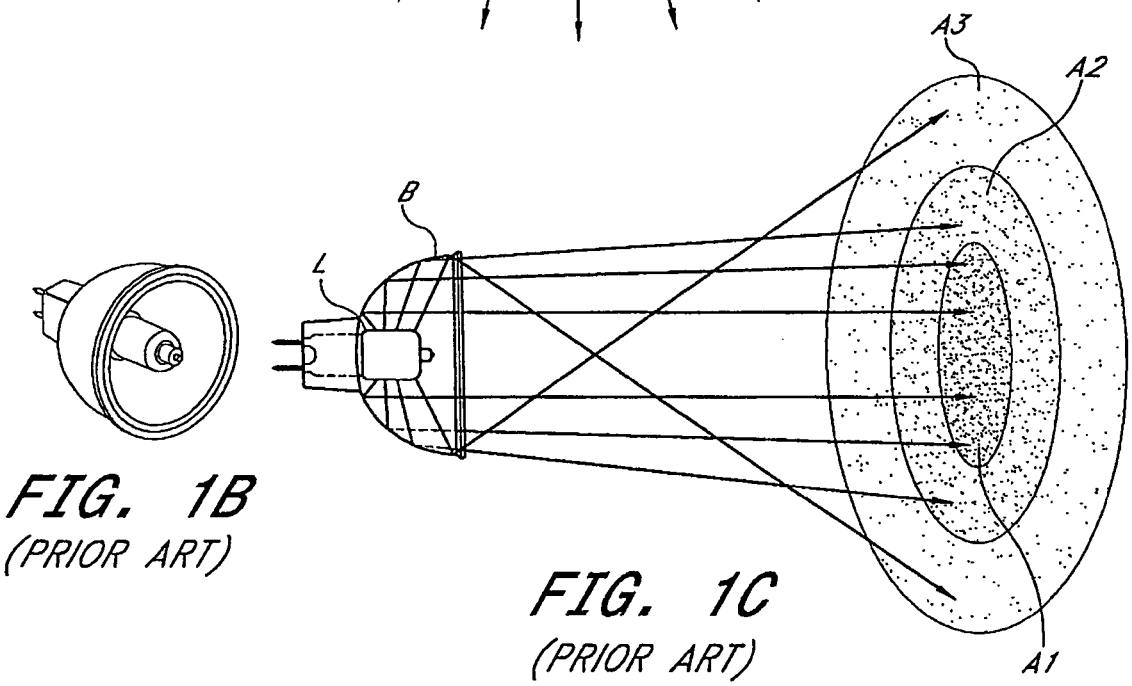
FIG. 1B (PRIOR ART)
FIG. 1C (PRIOR ART)
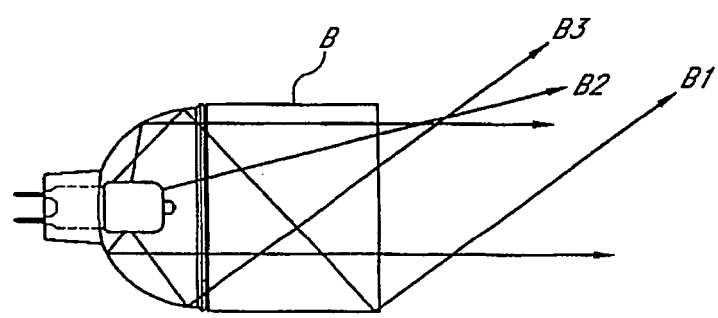
FIG. 1D (PRIOR ART)

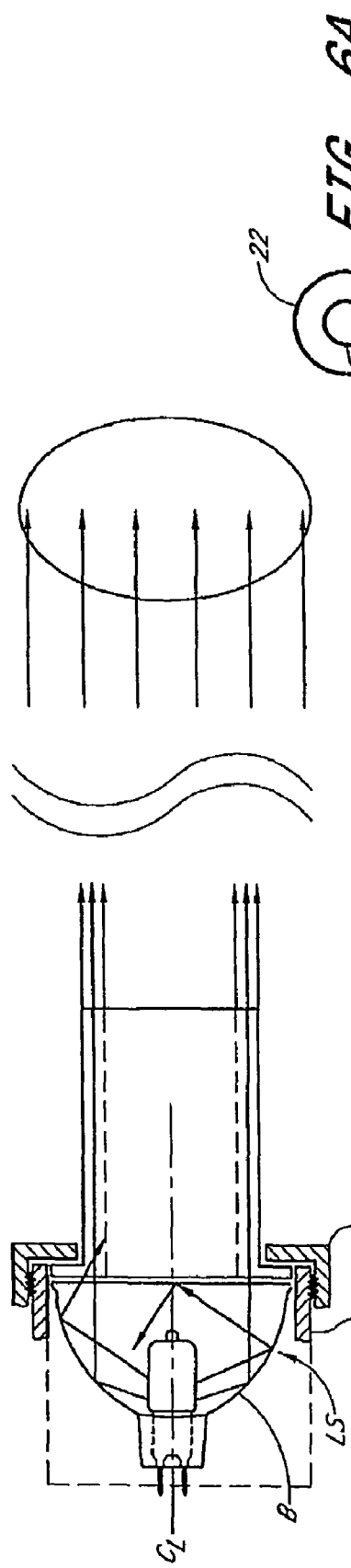
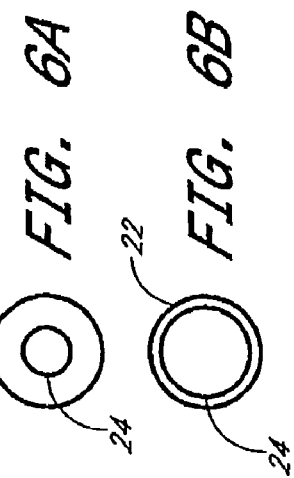
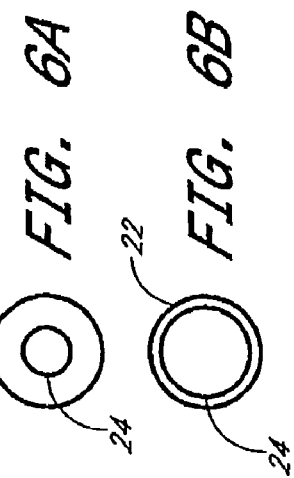
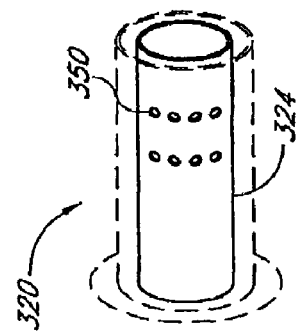
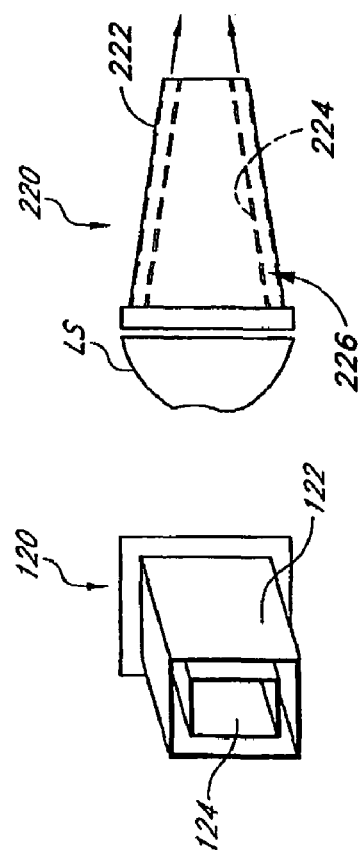

METHOD AND APPARATUS FOR DIRECTING LIGHT FROM A LIGHT SOURCE

RELATED APPLICATION DATA

This application is a continuation of U.S. application Ser. No. 10/993,009, filed Nov. 18, 2004, now U.S. Pat. No. 7,125,147.

FIELD OF THE INVENTION

The present invention relates to lights and lighting and, more particularly, to light directing guides.

BACKGROUND OF THE INVENTION

Lamps or lights are commonly utilized to illuminate and object or particular area. For example, in the home, lights may be utilized to illuminate wall-hanging artwork or a specific location such as a fireplace mantle. Frequently, it is desired that a particular light illuminate only these objects or locations specifically, rather than a broader area including that object or area more generally.

For example, lights may be utilized to illuminate an entire room. Such lights often include incandescent table-top and floor lamps, halogen floor lamps, overhead flourescent lamps and the like. These lamps are configured to illuminate large areas. In the above-described situations, it is desirable to utilize a spot light or lamp which is configured to direct light over a limited area.

Two examples of spot lights or lamps in accordance with the prior art are illustrated in FIGS. 1A and 1B. FIG. 1A illustrates a recessed "can" light. This light includes a lamp L which is configured to emit light which is directed downwardly, including downwardly through the open end of the housing H. FIG. 1B illustrates a track-type spot light. This light includes a lamp L positioned in a reflective body B. Light emitted by the lamp L is reflected outwardly. This type of light often comprises a halogen bulb located within a mirrored glass body.

In the case of the "can" light, the shape of the housing controls to some degree the area over which light emitted by the lamp is directed. Generally, however, while this area is more limited than a lamp which is not in any way shielded, light is emitted over a relatively large area. This is especially true in that these lights are generally mounted in a ceiling C, as illustrated in FIG. 1A. Objects under these lights are thus located some distance from the lights, permitting the light to disperse over quite a broad area before it reaches them.

In the case of the spot type lights illustrated in FIGS. 1B and 1C, the body of the lamp is generally angled (such as by following a parabolic path) in order to concentrate and reflect light in a single main direction. If the body is steeply angled, the light is more concentrated than if the body opens at a broad angle. In any event, even these spot lights direct light over a large area. In particular, while much of the light is concentrated so that it is emitted in a general direction and thus illuminates a particular area A1, because the light is reflected by a sloping surface, some beams of light are reflected at wide angles, still resulting in dispersion of the light over a rather large total area. Frequently, the light is dispersed into "bands" (see areas A2 and A3 in FIG. 1B) of successively diminished intensity. These bands are produced by small amounts of light which are reflected "off angle" to the main angle.

Some attempts have been made reduce this light dispersion and more effectively direct or guide light to a particular area. In one embodiment, a baffle B or shield is located in front of the light. FIG. 1D illustrates such a configuration. As illustrated, the baffle or shield generally comprises an element extending out from the light to shield or block some of the like.

The baffle B has the benefit of reducing some of the light dispersion. However, as illustrated by beam B1, the baffle B itself may reflect light at a wide angle. In addition, some beams (such as beam B2 illustrated) are not effectively blocked by the baffle B. As a result, light is still dispersed over a wide area, though the banding is less noticeable because the amounts of light which is transmitted at wider angles is reduced.

Another common problem with these type of spot lights is that the bulb is often visible from a wide range of angles. For example, spot lights which are mounted on tracks may be used to illuminate art in an art gallery. The lights are thus exposed for view. Across larger rooms and in other orientations, viewers may look directly into the light, causing both discomfort and detracting from the viewing of other objects.

Other attempts at masking have similar limitations and have been found to not effectively directed or guide light to a particular location from a light source and overcome other problems associated with such light sources.

SUMMARY OF THE INVENTION

The invention is a light directing device for use with a light source. The light directing device is configured to control the path of light from the light source.

In one embodiment, the invention is a light guide. The light guide has a first end and a second end. The light guide has an outer guide member and an inner guide member. The inner guide member is at least partially located in the outer guide member. A light passage extends from the first end to the second end of the light guide. At least a portion of the light passage is defined between the inner and outer guide members.

In use, the first end of the light guide is positioned adjacent a light source. Light is permitted to pass from the light source through only the light passage through the light guide. The light guide effectively blocks light which is not substantially aligned with the light passage, thus controlling the direction at which light which is transmitted therefrom. In particular, because off-angle light is blocked by the light guide, the light which is transmitted from the light guide is all substantially aligned axially with the light passage. This light is thus effectively "focused." The light guide reduces or eliminates light diffusion and associated problems such as light banding and visible bulb glare.

Various configuration of the light guide are contemplated. In one embodiment, the inner and outer guide members are substantially tubular in shape, each having a generally circular cross-sectional shape. The inner and outer guide members may have other shapes, such as a square cross-sectional shape.

The inner guide member effectively blocks the passage of light. In one embodiment, the inner guide member may comprise a solid member. In another embodiment, the inner guide member may be configured as a generally hollow tube which is blocked at one or more points, such as by having a closed first or second end.

In a preferred embodiment, the light passage has a length which is greater than its width. In general, the narrower the light passage, the more effective the guide in eliminating off-angle light and associated light diffusion and banding. The width of the light passage may be selected, however, when considering the size of an object or area to be illuminated and the distance of that object or area from the light source, so that the desired area of illumination is achieved.

The light guide is particular useful with light sources comprising a light emitting element located in a reflective body having an open end that light is directed towards. Such lights include spot type lights comprising parabolic or generally cone-shaped reflective bodies having a halogen bulb or other light emitting device. In such situations, reflection of the light by the body causes substantial amounts of light to be directed at wide angles from the light, contributing to light diffusion and visible banding.

In one embodiment, the light guide includes an outwardly extending flange at its first end for mounting the light guide to a light source or associated housing. In other embodiments, the light guide may be integrally formed with the light source or associated housing or be configured to mount thereto in other fashions.

The inner guide member may be configured as a heat transfer passage and include one or more vents permitting air exchange from the interior to the exterior thereof.

Further objects, features, and advantages of the present invention over the prior art will become apparent from the detailed description of the drawings which follows, when considered with the attached figures.

DESCRIPTION OF THE DRAWINGS

FIG. 1A illustrates a "can" type light in accordance with the prior art;

FIGS. 1B and 1C illustrate a spot type light in accordance with the prior art;

FIG. 1D illustrates the spot type light illustrated in FIG. 1B fitted with a baffle;

FIG. 5 is a side view of a light guide of the invention associated with a light source, the light guide directing light generated by the light source;

FIG. 6A is a first end view of light guide in accordance with the invention, the light guide defining a wide light passage;

FIG. 6B is a first end view of a light guide in accordance with the invention, the light guide defining a narrow light passage;

FIG. 7 illustrates another embodiment light guide in accordance with the invention;

FIG. 8 illustrates yet another embodiment light guide in accordance with the invention; and FIG. 9 illustrates an embodiment of a vented light guide in accordance with the invention.

DETAILED DESCRIPTION OF THE INVENTION

The invention is a light guide. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention is method and apparatus for directing or guiding light emitted from a light source. In general, the apparatus comprises a light guide. The light guide comprises an outer guide member and an inner guide member which cooperate to define a light channel through which light may pass. The light guide limits the direction that light may travel from the light source, thus controlling the area illuminated by light transmitted by the guide. The light guide is effective in directing light to a particular object or location.

Figure 2:
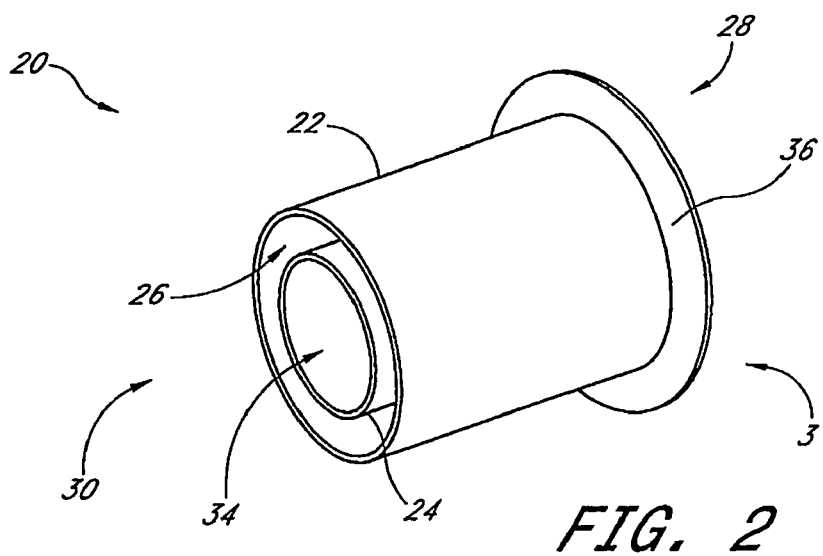
FIG. 2 is a perspective view of a light guide in accordance with an embodiment of the invention.

One embodiment of a light guide 20 in accordance with the invention is illustrated in FIG. 2. As illustrated, the light guide 20 comprises an outer guide member 22 and an inner guide member 24. The inner guide member 24 is located within the outer guide member 22. A light passage 26 is defined between the outer guide member 22 and the inner guide member 24.

In one embodiment, the inner and outer guide members 24,22 are cylindrical in shape. The inner and outer guide members 24,22 may be defined by a tubular wall, that wall having a generally circular cross-sectional shape. In this configuration, the outer guide member 24 has an inner dimension or diameter D1 which exceeds the maximum outer dimension or diameter D2 of the inner guide member 24 which is located in the outer guide member 22. In this configuration, the light passage 26 comprises the annular space between the inner guide member 24 and the outer guide member 22.

The light guide 20 has a first end 28 and a second end 30. In one embodiment, both the outer guide member 22 and the inner guide member 24 extend from the first end 28 to the second end 30 of the light guide 20. Preferably, the first end 28 of the light guide 20 is defined by the outer guide member 22. It is possible for the inner guide member 24 to extend beyond the outer guide member 22 and thus define the terminus of the second end 30 of the light guide 20. In other embodiments, the inner guide member 24 may not extend to the first and/or second end 28,30 of the light guide 20 (i.e. the inner guide member is recessed or set inwardly from the first and/or second end 28,30 of the light guide 30). In such instances, the light passage 26 may be defined only partially by the space between the outer guide member 22 and inner guide member 24 (for example, where the inner guide member 24 does not extend to the first end 28 of the light guide 20, light would be permitted to pass through the entire diameter of the outer guide member 22 at the first end 28 of the guide 20).

Figure 3:
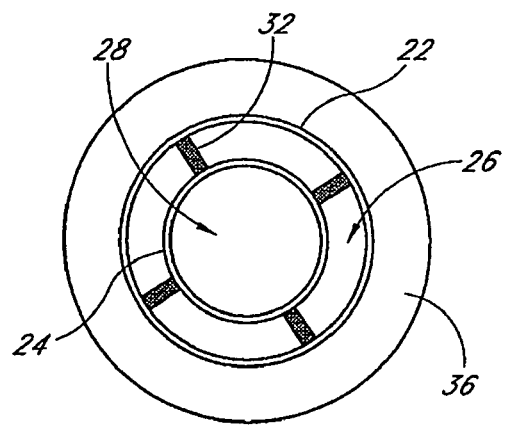
FIG. 3 is a first end view of the light guide illustrated in FIG. 2 taken in the direction of arrow 3 therein.
Figure 4:
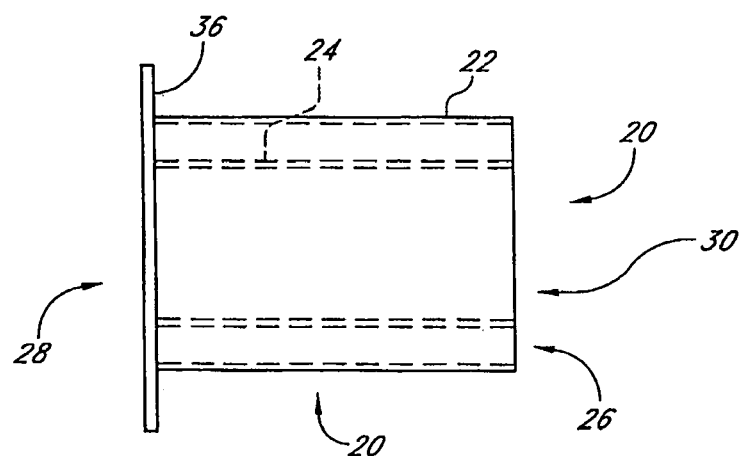
FIG. 4 is a side view of the light guide illustrated in FIG. 2.

Referring to FIG. 3, in one embodiment, the inner guide member 24 connected to the outer guide member 22 and supported in position relative thereto. As illustrated, a plurality of connectors 32 preferably connects the inner guide member 24 and the outer guide member 22.

Referring to FIG. 2, in the embodiment where the inner guide member 24 essentially comprises a hollow tube, the inner guide member 24 has an open or hollow interior area 34. Preferably, this space 34 is blocked at one or more points in order to prevent light from passing through the inner guide member 24 from the first end 28 to the second end 30 of the light guide 20 so that light can pass through the guide 20 only by passing through the light passage 26. As illustrated in FIG. 3, in one embodiment, the inner guide member 24 is blocked at the first end 28 of the light guide 20.

As described in more detail below, in one embodiment, the light guide 20 is configured to be mounted to a light source. Thus, in one embodiment, a flange 36 extends outwardly from the outer guide member 22 at the first end 28 of the light guide 20.

The light guide 20 may be constructed from a wide range of materials. In one embodiment, the light guide 20 is constructed from metal, such as light-weight aluminum. The light guide 20 may be constructed of other metals, plastic or the like, depending upon a number of factors including the amount of heat generated by the light source with which the light guide 20 is to be associated. In one embodiment, the light guide may be molded or machine from plastic. In that configuration, the light guide may essentially comprise a unitary body and have the light passage machined into the body so as to form the passage from the first end to the second end of the body.

One manner of use of the light guide 20 is illustrated in FIG. 5. Preferably, the light guide 20 is associated with a light source LS. As illustrated, the light source LS comprises a halogen type spot light in accordance with the prior art. As described above, this type of light includes a body B having an internal reflective, parabolic surface. A halogen lamp L is located in the body B and is configured to emit light. This light is reflected by the body B towards an open end of the body B.

Preferably, the light guide 20 is located at the open end of the body B of the light source LS. In one embodiment, the light guide 20 may be connected to the light source LS so as to be securely coupled thereto. Commonly, this type of light source LS is located in a housing H (only partially shown). A ring R is configured to threadingly engage the housing H and secure the light source LS in the housing H. The ring R may be selectively disconnected from the housing H in order to remove and replace the light source LS. In this embodiment, the flange 36 of the light guide 20 is configured to engage the body of the light source LS or the housing H. The ring R may be passed over the outer guide 22 and against the flange 36. In this manner, the flange 36 of the light guide 20 is secured beneath the ring R, thus maintaining the light guide 20 securely in position against the light source LS.

So associated with the light source LS, light is only permitted to pass from the light source LS to a point exterior thereto through the light passage 26 defined by the light guide 20. Because of the location and configuration of this light passage 26, only light which is transmitted from the light source LS which is substantially in alignment with the light passage 26 (i.e. is axially aligned) is permitted to pass through the light guide 20. Because this light passage is relatively narrow, the angle at which light may travel through and from the light guide 20 is controlled or limited. Because the angle at which light is emitted from the light guide 20 is limited the area of illumination is very controlled.

With the embodiment light guide 20 illustrated in FIG. 5 where the light passage 26 is circular, the light guide 20 effectively "focuses" the light to a circular area (it is noted that the area of illumination in FIG. 5 is not drawn to scale relative to the size of the light source LS and light guide 20). More importantly, because the angle at which light is permitted to pass through the light guide 20 is limited, light intensity in the "focus" area is high, and problems associated with light diffusion, including light banding, are eliminated.

FIGS. 2-5 illustrated but one configuration of a light guide of the invention. Referring to FIG. 7, the light guide may have other shapes than the embodiment just described. FIG. 7 illustrates an embodiment of a light guide 120 where an inner guide member 124 and an outer guides member 122 are square in cross-sectional shape. In this configuration, the light passage defined by the light guide 120 is also generally square in cross-sectional shape.

The inner and outer guides might have other cross-sectional shapes, such as oval, triangular, rectangular or irregular, among others. Such configurations may be useful for mating the light guide to different types of light sources, as well as defining illumination areas of various shapes. For example, a rectangular shaped light passage may be utilized to create a rectangular-shaped illumination area, such as for lighting a rectangular painting.

In the embodiment illustrated in FIG. 2, and as illustrated in FIG. 5, the distance of the light passage from a central axis C1 through the light guide remains constant. FIG. 8 illustrates a light guide 220 where the distance of a light passage 226 (between inner and outer guide members 224,222) from the central axis changes. In the particular embodiment illustrated, the light passage 226 is frusto-conical in shape. Such a configuration light guide 220 is useful in focusing or concentrating the light, as well as achieving the above-stated advantages and features. Of course, the light passage could be arranged at a variety of angles or positions relative to the light source, and have a variety of shapes and configurations.

It is noted that the width of the light passage may vary. For example, the width of the light passage at the first end of the light guide may be greater than the width of the light passage at the second end of the light guide (or vice versa), so long as the desired light directing functions are preserved. For example, the distance between the inner and outer guide members at the first end of the light guide may be greater than the distance between the inner and outer guide members at the second end of the light guide.

The length of the light guide and the width of the light passage are preferably selected to control the light transmission angle, and thus the "focus area" of light emitted through the light guide. First, the light guide is preferably at least as long from its first end to its second end as the width of the light passage (in FIG. 2, that width is the distance between the inside of the outer guide member 22 and the outside of the inner guide member 24). If the light passage is too short, then light at large or wide angles is not effectively blocked by the guide, and light dispersion occurs.

As indicated above, it is possible for the inner guide member to be shorter than the outer guide member. It has been found that the light directing benefits of the light guide are substantially reduced, however, if the inner guide member is very short. In such instance, off-angle light (i.e. light which is not substantially aligned with the light passage) is permitted to pass beyond the inner guide member and is then reflected down the interior of the outer guide member. While the percentage of that off-angle light is substantially reduced compared to when no light guide is used, that light may still result in some light diffusion beyond the desired focus area.

As illustrated in FIGS. 6A and 6B, the width of the light passage may be adjusted to change the size of the "focus area." In general, the greater the width of the light passage, the larger the total angle over which light is emitted from the light guide, and thus the larger the "focus area" of light. Thus, as illustrated in FIG. 6A, in a configuration such as illustrated in FIG. 2, if the diameter of the inner guide member 24 is much less than the diameter of the outer guide member 22, the width of the light passage is increased, and the "focus area" of emitted light is larger. Likewise, if the diameter of the inner guide member 24 is close to the diameter of the outer guide member 22, and then the light passage is very narrow, and the light is focused to a small area.

Of course, the area illuminated by light emitted by a light source through the light guide depends on the distance from the light guide. For example, the area of illumination by light emitted from the light guide at 10 feet is greater than that at 5 feet. Thus, when it is desired that a light guide be used with a light source in order to illuminate a specific object or area, the configuration of the light guide should be selected when considering the distance from the light guide to the object or area to be illuminated, and also the size of the object or area to be illuminated.

As indicated above, the shape and size of the light guide may vary. In one embodiment, where the light guide is utilized with a spot type light as illustrated in FIG. 5, that light having a body with an open end having a diameter of about 1.5 inches, the diameter of the flange of the light guide is about 2 inches, the inside diameter of the outer guide member is about 1.25 inches, the outer diameter of the inner guide member is about 1.25 inches (such that the light passage has a width of about 0.25 inches), and the light guide has a length from its first to its second end of about 2 inches.

The light guide of the invention may be utilized with other types of light sources than that specifically illustrated in FIG. 5. For example, the light guide could be utilized with a "can" type light which utilizes an incandescent bulb as its light emitting device. In that configuration, the light guide is preferably mounted to block the open end of the "can" or housing of the light, to thus effectively guide or direct light emitted from the bulb. The light guide could also be utilized to direct or guide light emitted from a variety of other sources, including LED, fluorescent and other types of light sources.

It is noted, however, that the light guide of the invention has particular utility with light sources which use a reflective body to direct light from the source, such as the above-described spot light. This is due to the fact that because the majority of the light is transmitted by reflection rather than direct emission from the light emitting device, light is directed over a much larger range of angles. Though the amount of light which is reflected at larger, wide angles is much less than that which is directed in the primary direction of focus by the body, the wider angle light results in light banding and light diffusion. The problem of light banding, for example, is generally less with "can" type lights where the housing of the light serves primarily as a shield rather than reflector. Even in those situations, however, substantial reduction in light diffusion is realized by using a light guide of the invention.

The light guide need not include a flange, and may include other features or elements. For example, the light guide may itself include a threaded flange or ring for direct connection to a housing of a light source LS. The light guide might also be integrally formed with a light source, or at least a housing thereof. The configuration illustrated in FIG. 2 has the advantage of permitting retro-fitting of existing light sources with the light guide.

It is noted that in many instances the body of the light source may be completely closed, or a glass lens or shield may be selectively located over the otherwise open end of the reflective body. Such configurations are common for lights such as that illustrated in FIG. 5 where the end of the body is closed to prevent injury which might result if the halogen bulb exploded and to prevent contact of flammable items with the high temperature bulb. In such instances, the light guide is preferably located adjacent that enclosed end of the body or the glass shield. Again, the particular manner by which the light guide is associated with the light source may vary depending on the configuration of the light source.

In the preferred embodiment, the light guide is associated with a light source in a manner preventing light from being transmitted from the light source through other than the light guide. Thus, the light guide is preferably sized to fit over and obscure the light source, but for the light passage through the light guide.

In order to achieve the above-stated objective of preventing light from passing from the light source through other than the guide, association of the light guide with the light source often results in the first end of the light source being positioned very close to the light source. In such situations, the light guide may be subjected to heat generated by the light source. In the case of a halogen light source, substantial heat may result in high temperatures. As indicated, the light guide may be constructed of a durable metal in order to withstand these temperatures without damage.

As indicated, in one embodiment, the inner guide member of the light guide may be closed at the first end of the light guide. In some situations, this may result in substantial reflection of heat back to the light source, which may result in higher than desired operating temperatures. As such, other configurations of the light guide may be utilized to address this problem. For example, FIG. 9 illustrates an embodiment light guide 320 where the inner guide member 324 is closed at the second end of the light guide 320. In this configuration, the inner guide member 324 is preferably hollow from its first to its second end. Preferably, vents 350, such as slots or other apertures, are provided in the wall forming the inner guide member 324. These vents 350 permit heat exchange by flow of gas from the interior of the inner guide member 324 to a point exterior thereto. In this manner, cooling of the interior of the light guide and the area adjacent the light source is effected.

Preferably, the vents 350 are configured to limit light transmission there through. The vents 350 may include internal shielding or baffling so as to prevent light transmission while still permitting air flow. In other embodiments, baffling, such as tilted panels or mesh, may be located in the inner guide member 324 to block light but permit air flow there through.

While the inner guide member of the light guide has been described as being a generally hollow tubular member, the inner guide member may be solid. In addition, the inner guide member need not have the same exterior shape as the interior shape of the outer guide member. Likewise, the outer shape of the outer guide member may vary, such as for aesthetic purposes.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A light comprising:
 a light guide having a first end and a second end, said light guide comprising a light blocking inner guide member located in an outer guide member, said light guide including a light passage extending from said first end to said second end, said light passage positioned at least partially between said inner guide member and said outer guide member; and a light source located at one of said first or second ends of said light guide, said light source configured to emit light, a portion of which is permitted to pass through said light passage of said light guide.

2. The light in accordance with claim 1 wherein said inner guide member is tubular in shape.

3. The light in accordance with claim 2 wherein said inner guide member is solid.

4. The light in accordance with claim 2 wherein said inner guide member is substantially hollow and has at least one light blocking element located therein.

5. The light in accordance with claim 4 wherein said inner guide member has a first end and a second end and said light blocking element comprises a closed first or second end of said inner guide member.

6. The light in accordance with claim 1 wherein said inner guide member is supported by said outer guide member within said outer guide member.

7. The light in accordance with claim 1 wherein a mounting flange extends outwardly from said outer guide member at said second end of said light guide.

8. The light in accordance with claim 1 wherein said inner guide member and outer guide member both extend from said first end to said second end of said light guide.

9. The light in accordance with claim 1 wherein said inner and outer guide members have a circular cross-sectional shape.

10. The light in accordance with claim 1 wherein said inner and outer guide members have a square cross-sectional shape.

11. The light in accordance with claim 1 wherein said inner guide member is substantially hollow and closed at said second end of said light guide.

12. The light in accordance with claim 11 including one or more vents in said inner guide member configured to permit air to pass from an interior of said inner guide member to an exterior of said inner guide member.

13. The light in accordance with claim 12 wherein said inner guide member is defined by a wall and said one or more vents comprises openings in said wall.

14. The light in accordance with claim 1 wherein said light source is positioned in a body.

15. The light in accordance with claim 14 wherein said body has a generally closed first end and a generally open second end and said light source is located between said first and second ends of said body.

16. The light in accordance with claim 15 wherein said body has an inner surface and an outer surface and said inner surface which extends about said light source is reflective.

* * * * *